Oct. 19, 1943.  M. I. TEAGUE  2,332,413
COTTON DRYING MACHINE
Filed April 15, 1941  2 Sheets-Sheet 2

Martin I. Teague
INVENTOR.

BY
ATTORNEY.

Patented Oct. 19, 1943

2,332,413

UNITED STATES PATENT OFFICE 2,332,413

COTTON DRYING MACHINE

Martin I. Teague, Rochester, Tex.

Application April 15, 1941, Serial No. 388,690

3 Claims. (Cl. 34—57)

This invention relates to an improvement in cotton drying machines of the character used for drying unginned or seed cotton.

Heretofore, cotton driers have been objectionable because the hot air that is passed through the drier with the cotton causes the latter to release a certain amount of trash and small particles of fuzz which collect on the hot air outlet screen, clogging the screen and interfering with the air passage therethrough. This clogging of the screen with trash and foreign matter causes the air to be deflected to the cleaner, but such action interferes with the operation of the cleaner.

The object of this invention is to clean and remove the trash and small particles of fuzz and lint from the air passage screen of the drier in a simple and effective manner which does not interfere with the feeding of the cotton to the cleaner and gin, but facilitates the feeding action, forcing the foreign matter to be carried along with the cotton stream to a point where it can be removed effectively therefrom.

This is accomplished by the provision of a rotary brush structure of skeleton structure which brush operates in brushing relation to the screen but in a direction counter to the normal air flow through the screen and the opposite side of the brush moves in a direction which tends to cause the cotton to be directed to the outlet passage of the drier leading to the cleaner or gin stands without permitting the cotton to collect on the screen, and removing any foreign particles such as trash or fuzz that may collect on the screen and directing these into the passage leading to the cleaner where they may be removed from the cotton.

A preferred embodiment of the invention is illustrated in the accompanying drawings, in which.

Figure 1:
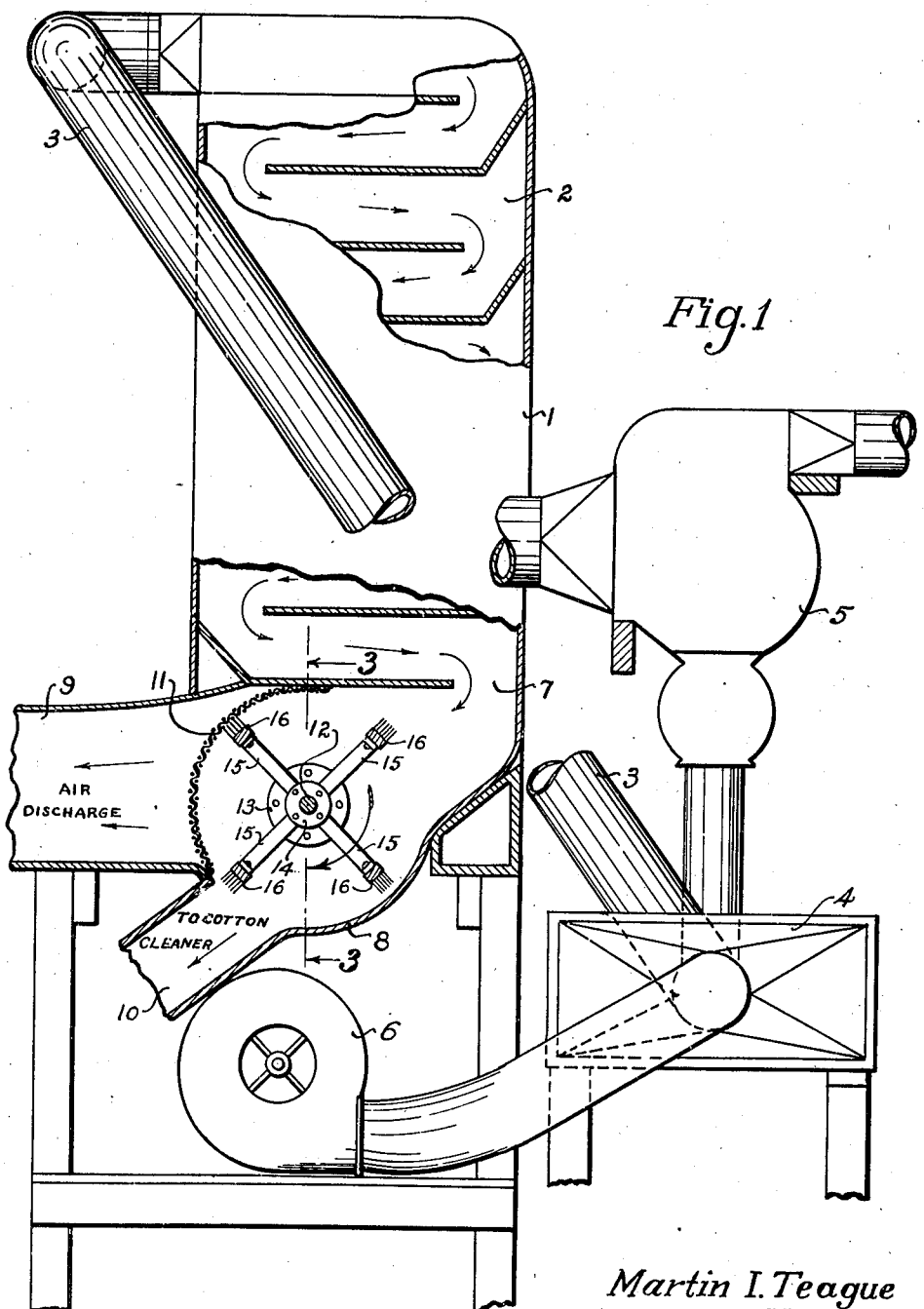
Fig. 1 is a vertical sectional view through a cotton drier embodying this invention with parts shown in elevation.
Figure 2:
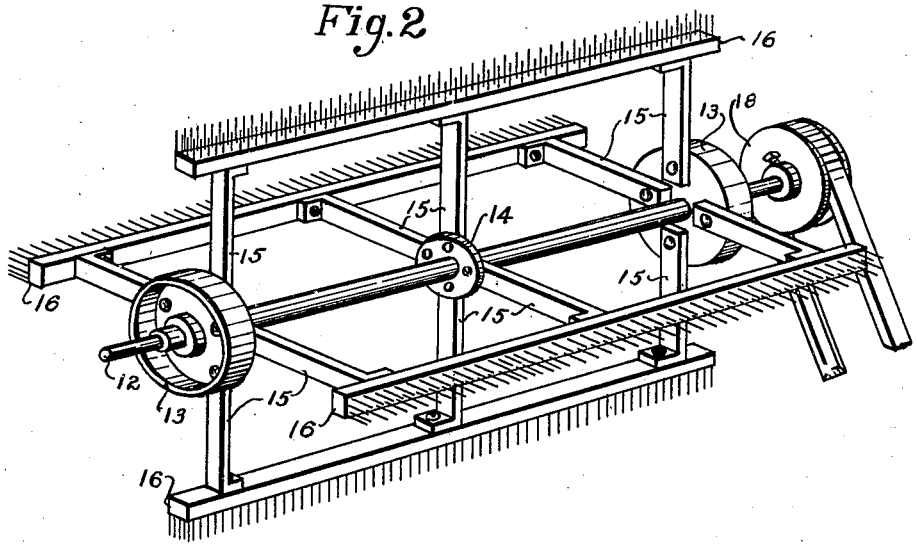
Fig. 2 is a perspective view of the rotary screen cleaning brush, removed.
Figure 3:
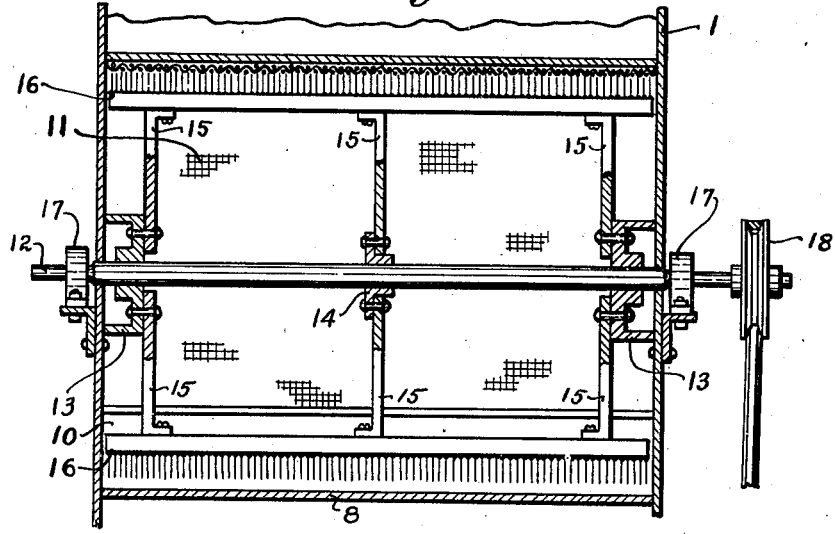
Fig. 3 is a detail cross section substantially on the line 3—3 of Fig. 1.

Fig. 1 shows a portion of a cotton drier adapted to receive seed cotton for drying purposes and to direct the same to a cotton cleaner which in turn supplies the cotton to the gin stands. The drier 1, has a zigzag passageway 2 therein for vertical passage of the cotton therethrough, the upper end of which communicates with a feed pipe 3 leading from a heater unit 4. Air is supplied to the pipe 3 under pressure through the heater unit 4 from a blower 6, while the cotton is supplied to the pipe 3 from a separator 5 of conventional structure in a manner well understood in the art, and passes upward through the pipe 3 to the top of the drier 2, under the influence of air under pressure supplied by the blower 6, the air being heated as it passes thereto to produce a drying effect on the cotton.

After the cotton passes downwardly through the drying passages 2, it is discharged therefrom through an opening 7 into one side of a substantially cylindrical casing 8, the opposite side of which casing 8 has an air discharge passageway 9, and a separate cotton discharge passageway 10 leading to the cotton cleaner and gin stands of the conventional cotton gin. The entrance end of the passageway 9 is covered by an arcuate screen 11 forming a continuation of the cylindrical walls of the casing 8 concentric therewith.

Mounted within the casing 8 is a rotary brush structure in contact brushing relation therewith and adapted to clean foreign particles from the inner side of the screen 11. This brush structure is mounted on a shaft 12 which carries drums 13 fixed to opposite end portions thereof and a central hub 14 fixed to the shaft 12 intermediate said drums. Extending radially from said drums and intermediate hub 14 are spokes 15, having brushes 16 fixed to the outer ends thereof, having outwardly extending bristles in positions to wipe off or remove any accumulation of foreign particles on the inner surface of the screen 11.

The shaft 12 is journaled in bearings 17 mounted on the outer walls of the drier 1, externally thereof, and the drums 13 are in close contact with the inner side of said walls so as to exclude lint and foreign particles from the bearings. The outer end of the shaft 12 has a pulley 18 mounted thereon and secured thereto to receive a driving belt leading from a source of power which rotates the screen structure in the direction indicated by the arrow in Fig. 1, preferably at a relatively high speed.

The screens are secured over the hot air discharge and are usually in quite inaccessible places; for that reason, the manual cleaning of the screens is a rather difficult and time-consuming job. Heretofore, driers of this type have employed screens which required manual cleaning several times during the course of a day, under some conditions would become so clogged and choked and the air passage so obstructed that only enough cotton for a single ball could pass through the drier before such manual cleaning of the screens became necessary. With this invention, the rotary brush operating in contact with the inner arcuate surface of the screen 11, keeps the screen free from any accumulation of foreign particles as these are continuously brushed therefrom and directed into the path of the cotton as it passes through the casing 8 and the passageway 10 into the cleaner where such particles can be removed effectively, thus allowing the gin to operate without interruption and without the necessity for shut downs for the purpose of cleaning the screen.

It is pointed out that the air passing downward through the passage 7 and through the screen 11 lodges the fuzz and trash over the wires of the screen. By the movement of the brush upward along the screen in the reverse direction, these foreign particles are readily removed; whereas, if the brush rotated in the same direction as the air passing through the screen it would have a tendency to cause the particles to adhere more closely to the screen.

The skeleton structure of the rotary brush allows the cotton to pass thereby and therethrough, and the movement of the brush expedites the passing of the cotton from the inlet 7 through the casing 8 and into the passageway 10 downwardly to the cleaners (not shown). The brush rotates across the screen in a direction counter to the normal flow of air and in direct movement with the cotton as it passes downward through the opposite side of casing 8. The movement of the brush in this direction has a tendency to move the cotton to the side of the casing 8 opposite from the screen 11 and moving onward into the passageway 10. Thus the rotary brush effectively cleans the screen of foreign particles during the cleaning and ginning of the cotton without the necessity of interrupting operations for manually cleaning the hot air outlet screen.

I claim:

1. In a cotton drier, the combination of a casing having an inlet opening at one side thereof and having separate adjacent air and cotton discharge passageways substantially at the opposite side from said inlet opening, a screen arranged over the inner end of said air passageway, and a rotary brush mounted in said casing concentric therewith and including a shaft, drums fixed on said shaft adjacent opposite end portions thereof, an intermediate hub fixed on the shaft, radial arms extending outwardly from said drums and hub, and brushing members carried by and extending between the outer ends of the arms in positions to operate against the inner surface of the screen to remove foreign particles therefrom.

2. In a cotton drier, the combination of a casing having an inlet opening at one side thereof and having separate adjacent air and cotton discharge passageways substantially at the opposite side from said inlet opening, a screen arranged over the inner end of said air passageway, a rotary brush mounted in said casing concentric therewith and including a shaft, drums fixed on said shaft adjacent opposite end portions thereof, an intermediate hub fixed on the shaft, radial arms extending outwardly from said drums and hub, brushing members carried by and extending between the outer ends of the arms in positions to operate against the inner surface of the screen to remove foreign particles therefrom, and means connected with said shaft for rotating the brush in a direction to move the brushing members in a direction opposite to the flow of air from the inlet to the air passageway at one side of the rotary brush and in the direction of the movement of cotton from the inlet to the cotton passageway at the opposite side of the rotary brush.

3. In a cotton drier, the combination of a casing having an inlet opening at one side thereof and having separate air and cotton discharge passageways spaced from said inlet opening, a screen arranged over the inner end of said air passageway, and a rotary brush mounted in said casing adjacent said screen and including a shaft, drums fixed on said shaft adjacent opposite end portions thereof, radial arms extending outwardly from said drums, and brushing members carried by and extending between the outer ends of the arms in positions to operate against the inner surface of the screen to remove foreign particles therefrom.

MARTIN I. TEAGUE.